United States Patent [19]

Walker et al.

[11] Patent Number: 4,772,180

[45] Date of Patent: Sep. 20, 1988

[54] AIRCRAFT THRUST CONTROL

[75] Inventors: Neil Walker, Cincinnati; Stanley G. Day, Montgomery; Paul D. Collopy, Blue Ash; George W. Bennett, Cincinnati, all of Ohio

[73] Assignee: General Electric Company, Cincinnati, Ohio

[21] Appl. No.: 902,231

[22] Filed: Aug. 29, 1986

[51] Int. Cl.$^4$ .............................................. B64C 11/48
[52] U.S. Cl. ........................................ 416/33; 416/25; 416/27
[58] Field of Search ...................... 416/25, 27, 33, 34, 416/127, 129, 130, 126, 28–30; 415/69, 77; 364/433, 434, 439, 565; 60/39.161, 226.1

[56] References Cited

U.S. PATENT DOCUMENTS

| 2,641,324 | 6/1953 | Fortescue | 416/27 X |
| 2,696,268 | 12/1954 | Marchant | 416/34 X |
| 2,761,517 | 9/1956 | Detamore et al. | 416/34 |
| 2,804,154 | 8/1957 | Treseder et al. | 416/127 X |
| 2,860,712 | 11/1958 | McDowell et al. | 416/27 X |
| 2,877,855 | 3/1959 | Farkas | 416/34 |
| 2,878,426 | 3/1959 | Preli et al. | 416/34 X |
| 2,887,621 | 5/1959 | Wilde | 416/34 X |
| 2,948,343 | 8/1960 | Conn et al. | 416/34 |
| 4,242,864 | 1/1981 | Cornett et al. | 60/226.1 |
| 4,621,978 | 11/1986 | Stuart | 416/127 |

FOREIGN PATENT DOCUMENTS 2129502 5/1984 United Kingdom .............. 416/129

Primary Examiner—Everette A. Powell, Jr.
Attorney, Agent, or Firm—Derek P. Lawrence; Nathan D. Herkamp

[57] ABSTRACT

An integrated control system for coaxial counterrotating aircraft propulsors driven by a common gas turbine engine. The system establishes an engine pressure ratio by control of fuel flow and uses the established pressure ratio to set propulsor speed. Propulsor speed is set by adjustment of blade pitch.

6 Claims, 5 Drawing Sheets

AIRCRAFT THRUST CONTROL

The invention herein described was made in the performance of work under a NASA contract and is subject to the provisions of Section 305 of the National Aeronautics and Space Act of 1958, Public Law 85-568 (72 Stat. 435; 42 USC 2457).

The present invention relates to the control of counterrotating propulsors in aircraft.

BACKGROUND OF THE INVENTION

FIG. 1 illustrates an aircraft 3 having tail-mounted gas turbine engines 6. The engines 6 each drive a fore propulsor 9F and an aft propulsor 9A which rotate in opposite directions about an axis.

FIG. 2 illustrates in greater detail the engine-propulsor system of FIG. 1. To the left is a gas turbine engine 15 such as the F404 type manufactured by the assignee of the present application. For purposes of the present invention, the gas turbine engine 15 can be considered as a gas generator which generates a high energy gas stream 33 and supplies the gas stream 33 to a propulsor stage 36.

The propulsor stage 36 extracts energy from the gas stream 33 directly, by means of low-speed counterrotating turbine blade sets. (This is in distinction to the common approach of using a high-speed turbine whose speed is reduced in route to a propulsor by a reduction gearbox.) A first set of blades 39 extracts energy from the gas stream 33 and spins the forward propulsor 9F. A second set of blades 42 spins the aft propulsor 9A, but opposite in direction to fore propulsor 9F. Bearings 47 support the blade sets and propulsors and allow this counterrotation.

A pitch-change mechanism 52 for changing the pitch of the propulsors 9A and 9F is shown schematically. It is desirable to modulate the pitch-change mechanism 52 so that the propulsor speed is proper under the prevailing operating conditions of the aircraft.

Various monitors are located in the engine 15 including sensors 17, 21 which provide signals representative of gas pressure (P2, P46) and sensor 19 which provides signals representative of inlet air temperature. Signal P2 (inlet air pressure) and signal P46 (air pressure exiting engine 15) are used to develop engine pressure ratio (EPR). While EPR is known to be the ratio P46/P2, it will be appreciated that for a constant P2, EPR can be obtained directly from a measurement of P46. Rotor speed is also sensed by a monitor 23 and provided as a control signal from engine 15. These sensors and others not shown are well known in the engine art. One control system for an engine such as engine 15 is described in U.S. Pat. No. 4,242,864, the disclosure of which is hereby incorporated by reference.

Furthermore, it is desirable to provide sufficient energy in the gas stream 33 to effect rotation of the propulsors 9A and 9F at a speed and resultant pitch angle so as to permit such proper operation, or, more specifically, to meet a pilot's demand for engine thrust. An example of aircraft propulsor control for a propulsor driven by a gas turbine engine is given in commonly assigned U.S. patent application Ser. No. 737,972 filed May 28, 1985, the disclosure of which is hereby incorporated by reference.

OBJECTS OF THE INVENTION

It is an object of the present invention to provide an integrated control system for the pitch-changing mechanism of propulsors, and for the gas generator in a gas turbine engine.

It is a further object of the present invention to provide an integrated control system for a counterrotating propulsor system driven by a gas turbine engine.

SUMMARY OF THE INVENTION

In one form of the present invention, the pitches, speeds, and phase angle of counterrotating aircraft propulsors are controlled.

DETAILED DESCRIPTION

Figure 2:
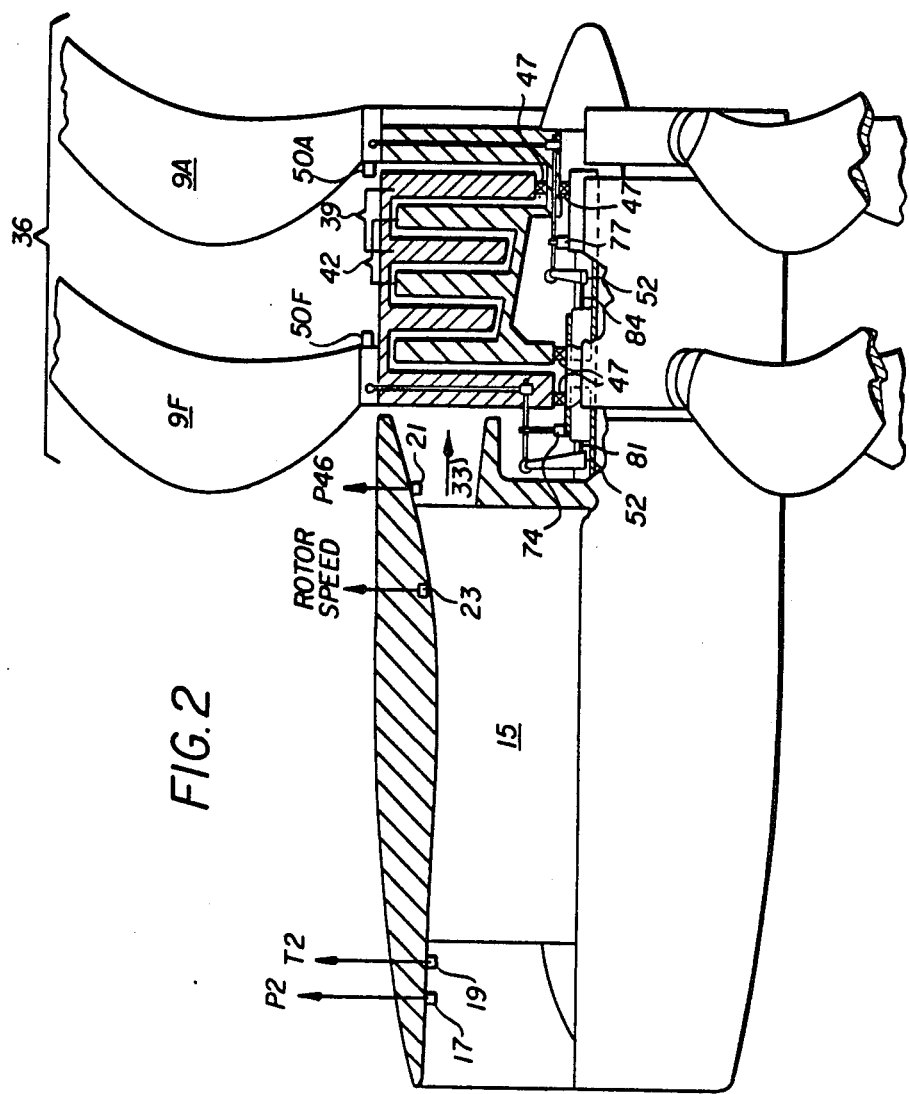
FIG. 2 illustrates in greater detail the counterrotating propulsors of FIG. 1.
Figure 3:
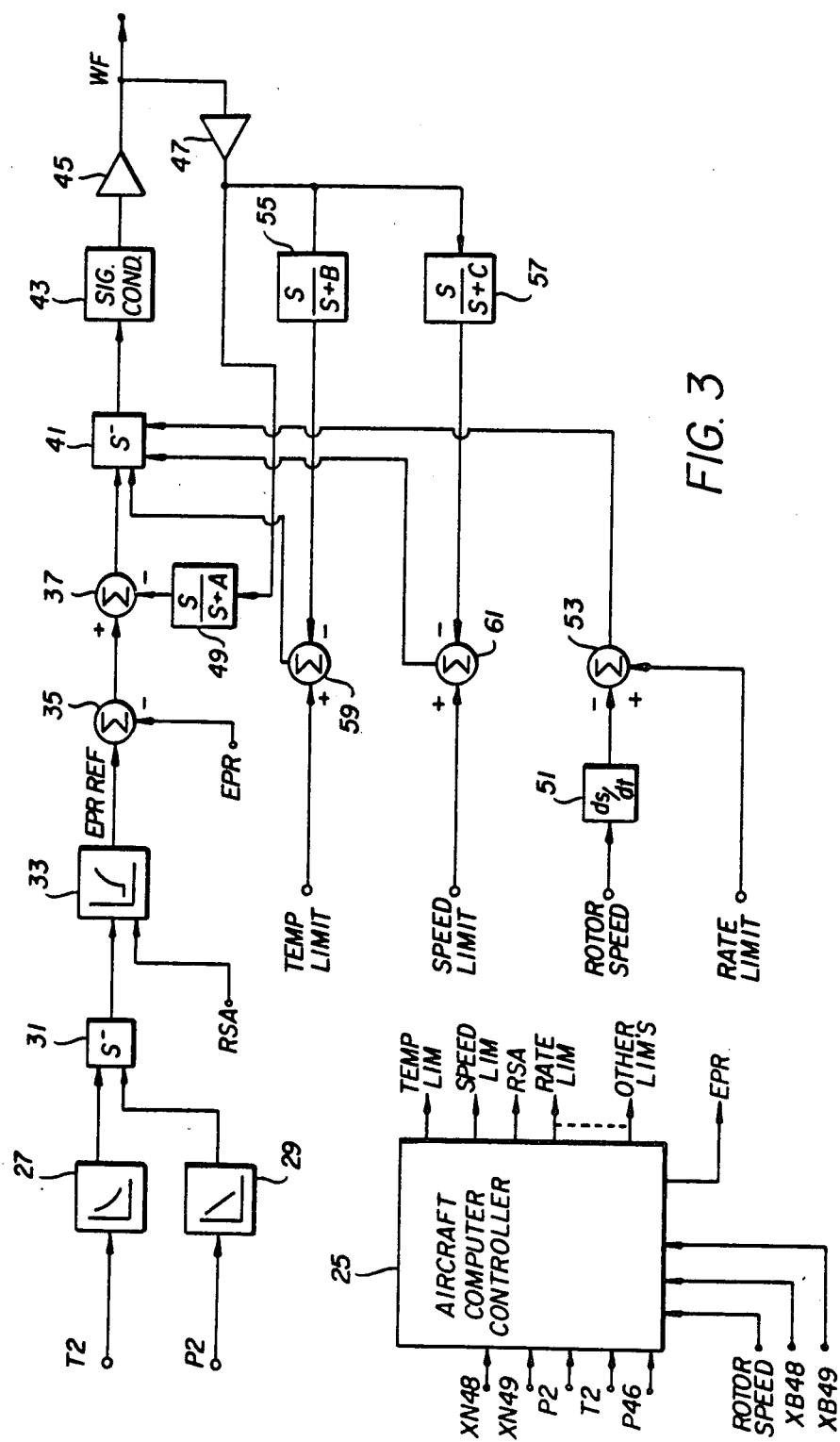
FIG. 3 illustrates a simplified functional block diagram of one form of a portion of the integrated control system of the present invention for establishing a fuel flow in a gas turbine engine.

FIG. 3 Illustrates one form of the portion of the present invention for determining fuel flow through the engine 15 in order to establish a desired EPR. Before going through the specific functions necessary to establish fuel flow, it should be noted that a computer controller provides most of the functions necessary to establish command signals for controlling fuel flow, propulsor speed and propulsor pitch angle. The computer is indicated at 25 having a number of inputs received from various sensors associated with the engine propulsor system of FIG. 2. While many of the implementing functions can be carried out by dedicated analog circuits, the equivalent functions are easily programmed into a digital computer and occupy much less space than the functional analog circuits. However, for purposes of description, the invention will be described in terms of analog dedicated circuitry and the conversion of that circuitry into digital computer programs will be apparent to those having ordinary skill in the art.

The sensors 17 and 19 provide the temperature and pressure signals T-2, P-2 respectively to function generators 27 and 29. The function generators 27 and 29 convert the pressure and temperature signals to signals representative of maximum values of engine pressure ratio which can be implemented in the engine 15 at the sensed temperature and pressure. The signals from function generators 27 and 29 are applied to a select circuit 31 which selects the smallest of the two input signals and provides that as an output signal. The circuit 31 thus provides a maximum allowed EPR for the engine 15. The signal is applied to a further function generator 33 for setting the maximum EPR reference. The second input to function generator 33 is a throttle position or thrust demand signal from a pilot control lever. The signal, indicated as RSA, may be taken directly from the aircraft pilot's throttle lever and may be indicative of the angle of the throttle lever. The RSA signal selects a point on an EPR curve, which curve is based upon known engine characteristics but has a maximum value set by the signal from select circuit 31. The output of the function generator 33 is an EPR reference signal.

The EPR reference signal is summed with an actual value of EPR which may be computed in the computer such as 25 by dividing the measured turbine exit pressure from sensor 21 with measured inlet pressure from sensor 17. The reference EPR and the actual EPR are summed in a summing junction 35 and an error signal representative of the difference between the reference and the measured values is applied to an additional summing junction 37.

The summing junction 37 is part of a feedback control loop 39 whose output is fuel flow or more particularly, weight flow of fuel indicated as WF. The control loop 39 includes a minimum selector circuit 41 which has an input the error feedback signal from summing junction 37, a temperature limit signal, a speed limit signal, and a rate limit signal. The select circuit 41 picks the smallest of these signals as a limit signal and applies it to a signal conditioning circuit 43. The signal conditioning circuit 43 adjusts the gain, offset and lead lag characteristics of the signal and applies it to a torque motor servo valve actuator 45 which controls a valve position in the fuel flow system for controlling the fuel to the engine 15. The position of the fuel valve is sensed at the output of actuator 45 and coupled through a signal conditioner 47 and rate/lag network 49 to the summing junction 37 to complete the feedback loop 39. The rate/lag is a derivative (ie, time rate) block followed by a lag block.

The temperature limit and speed limit values are predetermined limits on the engine 15. Temperature limit establishes an overheat limit while speed limit establishes a maximum value of rotor speed within the engine 15. Rotor speed is a measure value from sensor 23 of FIG. 2 and indicates the actual speed of the rotor in the engine 15. (The difference between the rotor speed and the speed limit is a speed error, but is identified in FIG. 3 and in the following text as "speed limit." Similarly, the difference between the temperature limit and the actual temperature is a temperature error, but identified as "temperature limit.") Rate limit represents an additional predetermined limit value and refers to the rate at which the rotor is allowed to change speed. Rotor speed is applied to a derivative block 51 which computes the rate of change of speed and compares it to the rate limit value. Any difference is an error signal which is applied to the select circuit 41 as a maximum value for restricting actuator 45.

Both the temperature limit and speed limit signals are modified by signals proportional (or other function of) to the fuel flow WF. As can be seen, the signal from the signal conditioning unit 47 is coupled to first and second stabilizing feedback networks 55 and 57 which then provide conditioned signals to summing junctions 59 and 61 respectively. In junctions 59 and 61, the temperature limit and speed limit respectively are modified by the feedback signals and the result of error signals are then coupled to the select circuit 41. In this manner, the select circuit 41 provides as an output the most restrictive of the temperature limit signal, speed limit signal, rotor speed rate signal, or engine pressure ratio signal. The output is thus developed by the illustrative circuit of FIG. 3, represents the fuel flow to the engine 15 which fuel flow establishes a desired pressure ratio.

Figure 1:
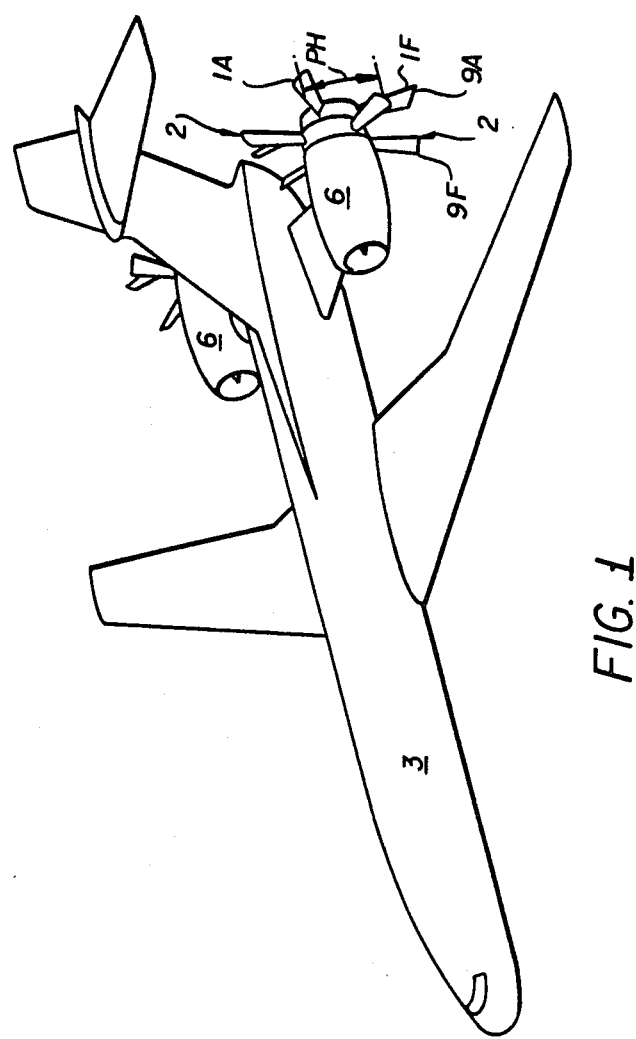
FIG. 1 illustates an aircraft having counterrotating propulsors.
Figure 4:
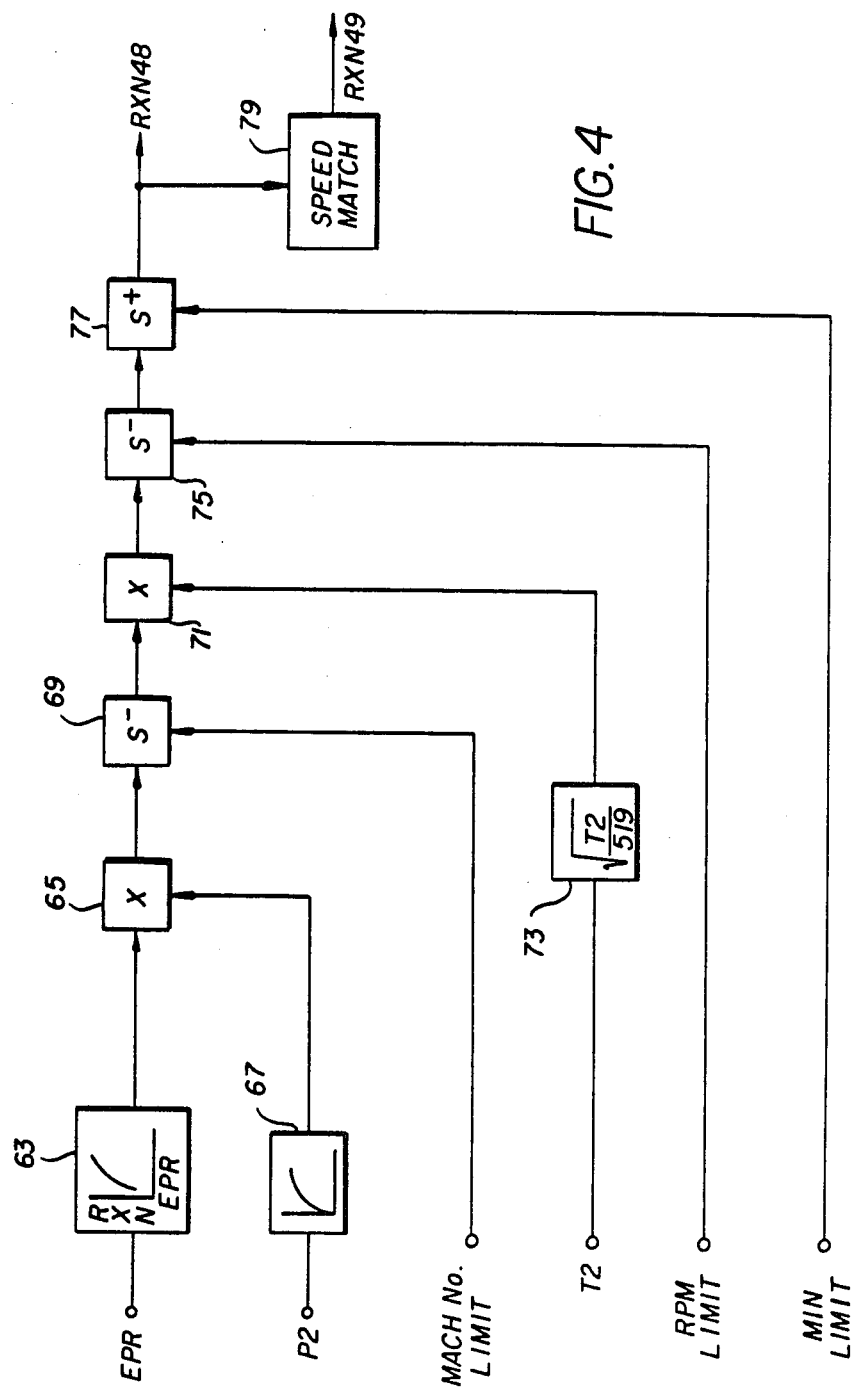
FIG. 4 is a simplified functional block diagram of one form of a portion of the present invention for developing propulsor speed based upon engine pressure ratio.

Referring now to FIG. 4, there is shown a functional block diagram of an illustrative circuit for developing propulsor speed for the counter-rotating propulsors 9a and 9f based upon the engine pressure ratio established by the fuel flow control of FIG. 3. As previously mentioned, the engine pressure ratio as a measured value is determined by the comparison of the pressure P-2 or engine inlet pressure and the pressure P-46 at the aft portion of engine 15. This ratio may be determined by the computer 25 of FIG. 3 and is then supplied to a function generator 63 which derives a reference speed for the propulsors 9a and 9f from the computed engine pressure ratio. The reference speed schedule is given in terms of corrected speed with the correction factor being the square root of the ratio between engine inlet total temperature and a standard temperature of 519 degrees Rankin. The functional relationship between EPR and corrected propulsor speed may be empirically or analytically determined from engine characteristics or may be determined from wind tunnel testing of the engine. The signal developed by block 63 represents a desired or corrected reference speed based upon a given EPR. The signal is applied to a block 65 which multiplies the reference corrected speed by a signal derived from engine inlet pressure P2. As will be apparent to those skilled in the art, the modification of the corrected speed signal as a function of the inlet pressure is required in order to compensate for the difference in temperature between the inlet air measured by sensor 19, which is used in the corrected speed computation, as opposed to the actual ambient air intersecting the blades 9a and 9f. If the actual ambient temperature were known, the modification of speed as a function of pressure P2 would not be required. The purpose of setting the propulsor reference in terms of corrected speed is to provide the desired scheduling of propulsor tip Mach number, i.e., the speed at blade tips 2 as shown in FIG. 1. Since (1) Mach number is a function of ambient temperature, and (2) propulsor blade tip should not exceed a specified Mach number, the speed reference is desirably modified as ambient temperature varies. This change is allowable Mach number is accomplished by block 71 which multiplies a signal representative of inlet air temperature by the allowable or reference propulsor speed. It should also be noted that prior to block 71, there is another selection block 69 which modifies the pressure corrected speed reference from block 65 by the mach number limit. The term Mach number limit only refers to a net air flow speed in rpm across the propulsor blades 9a and 9f. The block 69 selects either the signal from block 65 or the mach number limit signal in rpms and passes the lowest of those two on to the block 71. The temperature signal T2 is converted to appropriate proportional units in the square root function block 73 before application to the multiplier block 71.

The propulsor and speed reference signals are also constrained by two additional limit signals. The rpm limit is the maximum physical limit or speed of rotation of the propulsors 9a and 9f. The rpm limit represents a speed above which it becomes unsafe for the propulsors to rotate, i.e., the stress on the propulsors would exceed their design strength. Block 75 selects the signal from block 71 or the rpm limit as the maximum reference signal and passes the selected signal on to a further selection block 77. The minimum limit signal is designed to prevent the propulsors from going below an idle speed. This signal is applied to the block 77 which selects the higher of the signal from block 75 with a minimum limit and utilizes that as a final reference output signal for propulsor speed. Since the aft propulsor 9a is rotated at a speed proportional to the speed of the forward propulsor, the signal from block 77 is applied to a speed match circuit 79 which then provides a speed reference signal for the aft propulsor 9a that is directly proportional to the speed of the fore propulsor 9f. The signal labeled RXN48 and RXN49 represent respectively the desired speed of the forward propulsor 9f and the aft propulsor 9a.

Figure 5:
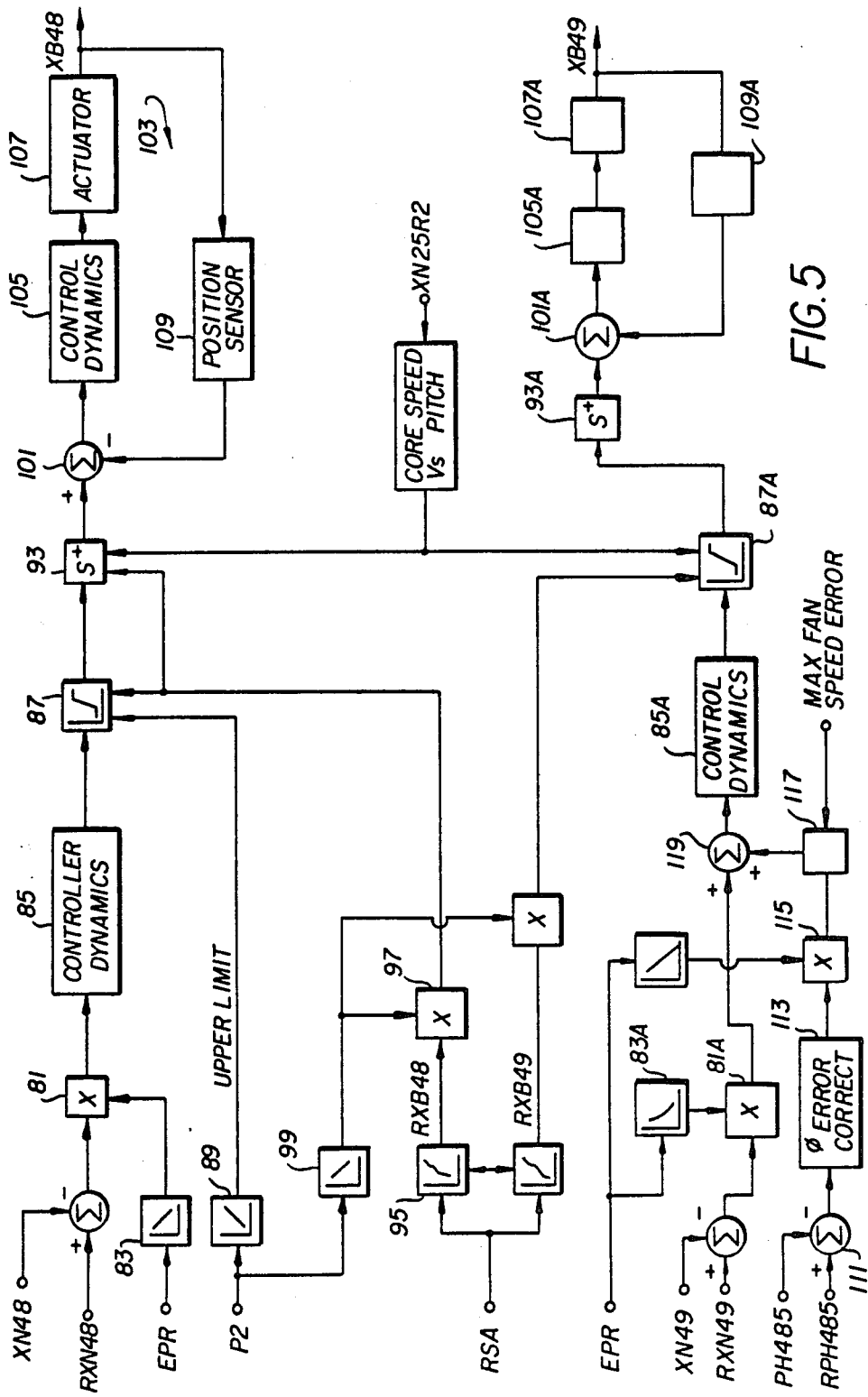
FIG. 5 is an illustrative simplified functional block diagram of a portion of the present invention for controlling propulsor pitch angle.

FIG. 5 illustrates a circuit for implementing speed control of the propulsors 9a and 9f by controlling their pitch or blade attack angle and consequently the loading reflected to the rotor stages driving the propulsors 9a and 9f. Considering first the forward propulsor 9f, the speed reference signal RXN48 is summed in summer 80 with a speed feedback signal XN48 representative of propulsor speed. The resulting error signal is applied to a multiplier circuit 81 where it is multiplied by a signal proportional to the engine pressure ratio. The latter signal is derived from a function generator 83 which receives the EPR signal and converts it to a corresponding speed related signal. The purpose of this multiplication is to adjust the loop gain as a function of power.

The speed reference error signal developed by the block 81 is coupled to a controller dynamic circuit 85 which is essentially a proportional plus integral controller including gain, offset and lead-lag compensation. Alternately, any controller which will minimize speed error in a stable manner will suffice. The output of the circuit 85 is a pitch angle demand signal. The pitch angle demand signal is then applied to a limit circuit 87. The limit circuit 87 linearly passes the signal from the circuit 85 but restricts the maximum and minimum values of the signals as a function of inlet pressure P2 and a minimum schedule which is a function of throttle position RSA. The maximum or upper limit is a function of P2 although the limit would preferrably be Mach number if that measurement were available. The lower limit is established as a function of throttle position RSA as modified by inlet pressure P2. For both limits, P2 is representative of flight conditions.

The pitch angle demand signal is coupled from block 87 to a select block 93 which selects the lowest value from one of several input signals. In addition to the pitch angle demand signal, there is provided an RSA throttle reference signal from block 97 and a core spaced reference angle limit from block 91. The block 91 converst corrected core speed XN25R to a pitch angle limit. The pitch angle limit from block 91 is utilized at start-up at which time engine core speeds are below idle speeds. The reason for using this lower pitch angle limit is that the blade pitch angle at start-up is normally set for 90° (feathered) whereas at idle speed the blade should be at approximately 10° (sea level static). In order to schedule the transition of the blade pitch angle smoothly from 90° to 10°, it is necessary to provide a lower limit to the circuitry in block 93 so that the blades don't actually start changing pitch until core speed reaches about 5,000 RPM. The transition from 5,000 RPM to idle speed of about 10,000 RPM then is smoothly accomplished. Once the idle speed is reached, the lower limit does not normally come into play.

The output signal developed by the block 93 under normal, non-limited operating conditions is a pitch angle for the forward propulsor 9F required to obtain the speed scheduled by block 63 (FIG. 4). This signal can be overriden by the actual throttle lever position, RSA (adjusted by P2) which is also input to the block 93. Block 93 is similar to the previously described select circuits which pick the larger (or the smaller) of a plurality of input signals and provide that signal as an output signal. Before continuing with the pitch control loop, it should be noted that the RSA signal representing throttle position is input to a function generator block 95 which converts it to an appropriate pitch angle reference signal RXB48. This pitch angle is also modified as a function of engine inlet pressure P2 in block 97 before being applied to the select circuit block 93. A function generator 99 converts the pressure signal P2 to an appropriate multiplier for establishing a lower bound which can be at a higher angle at higher flight speeds.

Continuing now with the pitch control loop, the signal from select circuit block 93 is applied to the summing junction 101 which forms part of a feedback control loop 103. An error signal produced by the summing junction 101 is coupled to a dynamic pitch control block 105 which includes a gain and lead-lag network (or other suitable compensation) for conditioning the error signal for application to an actuator 107 which actually controls the pitch angle of the forward blades 9F. The actuator 107 may be a hydraulic servo actuator or a torque motor servo valve controlling fluid pressure to a hydraulic actuator. Dynamic compensation in the controller produces rapid transient response without introducing overshoot and instability. The feedback from the actuator is coupled through a pitch position sensor 109 to a second input terminal of the summing junction 101 to complete the feedback loop 103. The lower portion of the functional block diagram of FIG. 5 is essentially the same as the upper portion but designed for control of the aft propulsor 9A. All of the blocks in the aft propulsor control which are identical to the blocks in the forward propulsor control circuit are indicated by a common number with an A suffix. The primary difference between the forward propulsor pitch control and the aft propulsor pitch control is the synchrophasing control for maintaining predetermined phase synchronizing between the forward and aft propulsors. The synchrophasing of the forward and aft propulsors is described in the aforementioned patent application Ser. No. 737,292. In essence, when synchronizing occurs, the propulsors are counterrotating and have the same speed. At any point in time, there exists a phase angle between the blades of the forward and aft rows that is within a band of ±22.5 degrees. Synchrophasing allows one to demand a phase angle in this band and achieve it by slipping the speed of the aft propulsor relative to the forward propulsor. Appropriate trimming of this phase angle results in a reduction in acoustic noise.

The actual phase (PH485) and the reference phase (RPH 485), derived in a manner described in the aforementioned U.S. patent application Ser. No. 737,292 are applied to a summer 111 to derive a phase error signal. Phase error is adjusted to fall within ±22.5 degrees in block 113. A propulsor speed and phase sensor system is also disclosed in U.S. patent application Ser. No. 808,147 filed Dec. 12, 1985, the disclosure of which is hereby incorporated by reference.

The phase error signal from block 113 is then applied to a multiplier circuit 115 which has a multiplier signal proportional to engine pressure ratio to increase the loop gain at low power levels. The signal from block 115 is compared against a maximum fan speed error in block 117. Block 117 disables the synchrophasing function when propulser speeds are outside a predetermined band. From block 117 the signal is coupled to block 119. The error signal from block 119 is summed with the speed reference signal from block 81A and the summed signal is applied to the control dynamic circuit 85A. The phase error correction circuit actually adds an increment to the reference speed signal from block 81A in order to adjust the phase angle of the aft propulsors 9A with respect to the forward propulsors 9F.

Considering now the combination of FIGS. 1-5, it can be seen that an engine pressure ratio is established as a function of throttle position or thrust demand from the aircraft operator and that throttle position is converted to an engine pressure ratio by scheduling of fuel flow to the engine. Thereafter, the engine pressure ratio is utilized to derive a propulsor speed which speed is set by controlling the propulsor pitch angle. In the counterrotating system illustrated, the speed of the forward propulsor is set and the speed of the aft propulsor is then established as a predetermined function of the speed of the forward propulsor. In addition, the phasing or crossing of the blades in the aft propulsor with the blades in the fore propulsor is controlled so as to minimize noise generated by the counterrotating propulsors. In the illustrative implementation, the engine pressure ratio selected by throttle position is limited by a number of variables including the need to operate the engine 15 within predetermined temperature and speed limits. Furthermore, the engine rate of change of speed is limited to reduce the stress on the engine is response to sudden throttle position changes.

Although engine pressure ratio established a desired operating speed for the propulsors, that speed is restricted as a function of ambient temperature so that air passing over the propulsor tips does not become super sonic and cause undue turbulence. Furthermore, the speed is limited by the maximum physcial capability of the propulsors. The illustrative embodiment also illustrates control of the propulsor speed by varying blade attach or pitch angle so as to modify the loading on the propulsors for speed control.

Although the description of the invention has been given in terms of functional block diagrams similar to analog type circuitry, it will be appreciated that each of the above functions could be easily implemented in a digital computer and that such a limitation may in some instances provide improved performance over analog implementation. Furthermore, while EPR has been disclosed as a preferred method of determining how much energy is absorbed by the gas turbine (and therefore how much energy is available for the propulsors), other measurements such as, for example, gas generator RPM, engine air flow or some combination of these may be used in place of or with EPR. Accordingly, it will be apparent that numerous modifications and substitutions can be undertaken without departing from the true spirit and scope of the invention as defined in the following claims.

We claim:

1. An integrated control system for fore and aft propulsors rotating about a common axis and driven by a common gas turbine engine comprising:
   means responsive to an engine throttle position for establishing a corresponding power level in the engine;
   means responsive to the power level developed by the engine for controlling pitch angle of the fore propulsor to establish a propulsor speed as a function of the power level;
   means responsive to the speed of the fore propulsor for establishing a speed for the aft propulsor; and
   means for synchrophasing the fore and aft propulsors.

2. The control system of claim 1 wherein said means responsive to engine throttle position comprises means for establishing an engine pressure ratio by scheduling of fuel flow to the engine.

3. An integrated control system for fore and aft propulsors driven by a common gas turbine engine comprising:
   means responsive to engine pressure ratio for establishing a desired propulsor speed; and
   means for adjusting the speed of one of the fore and aft propulsors to maintain a predetermined phase angle between the tow propulsors.

4. An integrated control system for fore and aft propulsors driven by a common gas turbine engine comprising:
   means responsive to a thrust command for establishing a desired engine pressure ratio (EPR);
   means for setting an engine fuel flow to produce the desired EPR;
   means responsive to measured engine EPR for setting a desired propulsor speed;
   means responsive to the desired propulsor speed for varying the pitch angle of each of the fore and aft propulsors in a direction to achieve the desired speed for each propulsor; and
   means responsive to the phase angle between the fore and aft propulsors for adjusting the aft propulsor speed to establish a desired phase angle.

5. An integrated control system for fore and aft propulsors rotating about a common axis and driven by a common gas turbine engine comprising:
   means responsive to an engine throttle position for setting an engine pressure ratio by scheduling of fuel flow to the engine;
   means responsive to the engine pressure ratio for controlling the blade angle of one of the fore and aft propulsors to thereby establish a speed for the one of the propulsors; and
   means responsive to the speed of the one of the propulsors for controlling the blade angle of the other of the propulsors for establishing its speed as a function of the one of the propulsors.

6. An integrated control system for a gas turbine engine, the engine being coupled for driving a pair of counter rotating coaxial propulsors, the system comprising:
   means responsive to a thrust command for establishing a corresponding engine pressure ratio by scheduling fuel flow to the engine;
   means responsive to the established engine pressure ratio for setting a desired propulsor speed for one of the propulsors;
   means responsive to the desired propulsor speed for adjusting blade pitch angle of the one of the propulsors for causing the propulsor to operate at the desired speed;
   means responsive to the speed of the one of the propulsors for establishing a desired speed for the other of the propulsors; and
   means responsive to the desired speed of the other of the propulsors for adjusting its blade pitch angle for causing it to operate at the desired speed of the other of the propulsors.

* * * * *